Patented Aug. 29, 1944

2,356,996

UNITED STATES PATENT OFFICE 2,356,996

PYRIDINE-AMINE-SALTS OF PARA-AMINO-BENZOIC ACID AND METHOD OF MAKING THE SAME

Samuel M. Gordon, Forest Hills, and Frank Kipnis, Brooklyn, N. Y., assignors to Endo Products, Inc., Richmond Hill, N. Y., a corporation of New York No Drawing. Application November 6, 1941, Serial No. 418,044

4 Claims. (Cl. 260—296)

Our invention relates to pyridine-amine-salts of para-amino-benzoic acid and a new and improved method of making the same.

One of the objects of our invention is to provide new amine compounds or amine salts of para-aminobenzoic acid which are dissociated in aqueous solution, the products of dissociation being para-aminobenzoic acid, and the associated amine group of the respective compound or salt. The improved salts or compounds are crystalline solids which are very soluble in water. Their solubility is much greater than the solubility of para-aminobenzoic acid.

Another object of our invention is to react an amino-pyridine with para-aminobenzoic acid in non-aqueous solution, from which the reaction product, which is insoluble in the solvent, is readily separated in solid crystalline form.

Other objects of our invention will be stated in the annexed description, which illustrates several preferred embodiments thereof.

The examples stated herein are by way of illustration, and the invention is not limited to their disclosure or to the details thereof, or to the substances mentioned therein by way of illustration of the general class or classes.

Example I

Whenever proportions are stated in this example or elsewhere, said proportions are by weight.

68 parts of alpha-aminopyridine are dissolved in 1000 parts of water, with gentle warming. This compound is also designated as 2-amino-pyridine or alpha-pyridylamine. It has a melting point of 56° C. 99.5 parts of para-aminobenzoic acid are then dissolved in the water. The reaction is completed very quickly in the aqueous solution. The temperature of the solution is about 90° C., during the reaction. Para-aminobenzoic acid is $NH_2C_6H_4COOH$ and it has a melting point of 187° C. It has low solubility in water. About 340 milligrams of para-aminobenzoic acid are soluble in 100 cc. of water at 9.6° C. One of the advantages of the improved compounds is that they are much more soluble in water than p-aminobenzoic acid. About 4200 milligrams of the reaction product are soluble in 100 cc. of water at a temperature of 25° C. Due to the dissociation of the reaction product in saturated aqueous solution, said saturated aqueous solution corresponds in effect to a solution of 25 milligrams of p-aminobenzoic acid per cubic centimeter, at room temperature of about 22–25° C. The reaction product is designated as alpha-pyridyl-ammonium-para-amino-benzoate. After the reaction product has been formed in aqueous solution as above mentioned, enough water is added to the solution while its temperature is maintained at about 60° C., to increase its volume to 3940 cc., in order to dilute the solution to the desired extent. The resultant solution (3940 cc.) is pale yellow, and when it is cooled to room temperature of about 22° C., there is no separation of solid.

Example II 94 parts of alpha amino-pyridine are dissolved in 300 cc. of hot methanol. This methanol may be absolute methanol, or it may be commercial methanol, which has traces of water. In this example, we prefer to use a solvent which is absolutely free from water, but the invention is not restricted to the use of such solvent. Instead of using absolute methanol or non-absolute methanol, we can use other solvents, which are preferably water-free, such as ethanol (absolute or non-absolute), or dioxane, propanol or isopropanol.

After the 94 parts of alpha amino-pyridine have been dissolved as above mentioned, 137 parts of p-aminobenzoic acid and 200 cc. of hot absolute methanol are added to said solution, with constant stirring. The temperature is maintained at about 65° C. The reaction is completed at said temperature of about 65° C., when the p-aminobenzoic acid has been dissolved. The solution is then filtered to separate any extraneous material, which may result from minute proportions of impurities in the reacting compounds. The aqueous solution which is mentioned in Example I may also be filtered. Said reacting compounds should be as pure as possible. The filtrate is allowed to cool to about 15° C. The reaction product is insoluble in absolute methanol at 15° C., so that the reaction product separates in the form of crystals. Said reaction product is also designated as alpha-pyridyl-ammonium-para-aminobenzoate. It has a melting point of 154.5° C. to 156.5° C. It is a colorless or slightly yellow compound. It is highly soluble at suitable respective temperatures in absolute methanol, ethanol, isopropanol and dioxane. The reaction product may be dissolved in any of said solvents, and then recrystallized. The dioxane above mentioned is p-dioxane, which is glycol ethylene ether. One of the advantages of this method is that the solid reaction product can be thus conveniently separated from the non-aqueous solvent, without requiring the use of absolute ethyl ether or other precipitants.

We can use beta-aminopyridine or gamma-aminopyridine, instead of alpha-aminopyridine, in the methods stated in Examples I and II, using the same proportions. Beta-aminopyrdine is also designated as 3-aminopyridine or beta-pyridylamine. It has a melting point of 64° C. Gamma-aminopyridine is also designated as 4-aminopyridine or gamma-pyridylamine. The reaction products thus secured are respectively designated as beta-pyridyl-ammonium-p-aminobenzoate and gamma-pyridyl-ammonium-p-aminobenzoate.

*Example III*

One hundred and nine parts of 2,6-diaminopyridine are dissolved in 500 cc. of water at about 40° C. and 274 parts of p-aminobenzoic acid are dissolved in the said warm aqueous solution. After the reaction has been completed, enough water to make the volume 10960 cc. is added. The clear solution is filtered to separate any extraneous material which may be present.

The clear filtrate is an aqueous solution of a salt or compound which is designated as 2,6-pyridyl-diammonium-p-aminobenzoate, or alpha-alpha'-pyridyl-diammonium-p-aminobenzoate.

Instead of using 2,6-diaminopyridine in the method of Example III, we can use 2-amino-6-methylpyridine.

The resulting reaction product is designated as pyridine - 6 - methyl-2-ammonium-p-aminobenzoate.

The improved compounds are designated generally as pyridylammonium-p-aminobenzoates. When the alpha-pyridyl-ammonium-p-aminobenzoate is used in aqueous solution in parenteral administration, the solution contains enough of the compound to correspond approximately to 25 mg. of p-aminobenzoic acid per cubic centimeter, and the pH value of the solution is 7.2, measured with the glass electrode.

The reaction products above described, and particularly the reaction product which is made according to Example II with the use of alpha-aminopyridine, are much less soluble in cold methanol than in hot methanol. The methanol is therefore a good crystallizing medium, and it is thus possible to obtain a crystallized salt at this stage, instead of a solution.

When we specify that the pyridyl ammonium p-aminobenzoates are substantially insoluble in absolute methanol at a temperature of approximately 15° C., this is merely to specify a convenient test for identifying the improved salts or compounds, by specifying a lower limit, and not by way of limitation of the invention. Therefore, if any compound or salt which comes within this general designation is insoluble or substantially insoluble in absolute methanol at a temperature above 15° C., such test will apply to said compound, and such compound is included in the invention.

The improved compounds can be administered in any manner. The improved compounds are useful for supplying in pure form, one of the antigray hair factors which are present in natural vitamin B complex. In the aqueous solution which is secured by following Example I, whose total volume is 3940 cubic centimeters, the hydrogen ion concentration is approximately that of body fluids. The improved compound or compounds can therefore be administered without body irritation.

The formulas of the compounds mentioned in claim 1 herein, are as follows:

I

Alpha-pyridyl-ammonium-p-aminobenzoate

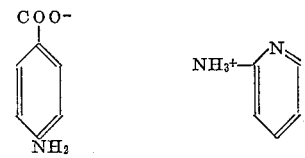

II

Beta-pyridyl-ammonium-p-aminobenzoate

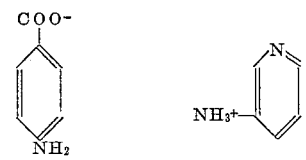

III

Gamma-pyridyl-ammonium-p-benzoate

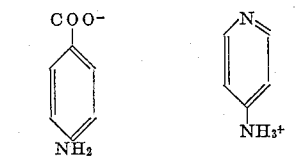

IV

Alpha-alpha'-pyridyl-diammonium-p-aminobenzoate

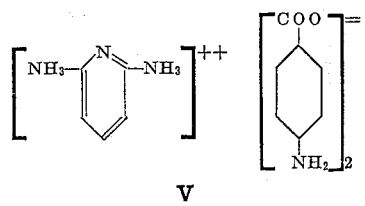

V

Pyridine-6-methyl-2-ammonium-p-aminobenzoate

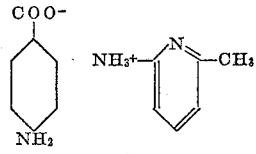

The formulas of the type of pyridyl-ammonium-p-aminobenzoate which is mentioned in claim 2 are as follows:

VI

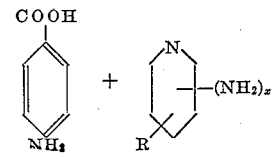

$(NH_2)_x$ may be at the alpha, beta, or gamma positions in the pyridine nucleus; "$x$" is "1" or "2"; "R" is "H" or "$CH_3$," and it may be at the alpha, beta, or gamma positions in the pyridine ring.

VII

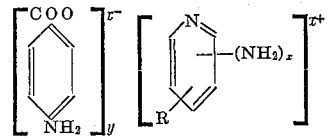

The designation "$x-$" represents a negative charge of 1 or 2, depending upon the value of $x$ in the compound of Formula VI, and $x^+$ represents a positive charge of 1 or 2, depending on the value of $x$ in the compound of Formula VI, and $y$ represents a value of 1 or 2, depending on the value of $x$ in the compound of Formula VI.

The formulas of claim 2, namely, Formulas VI and VII, apply to claims 3 and 4.

The graphic formula of pyridine is,

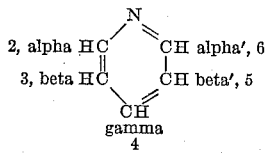

The above graphic formula of pyridine is sufficient to designate the graphic formulas of the various amino-pyridines which are stated herein.

The aminopyridines are well-known compounds. For example, it is stated on p. 476 of "Standard Chemical & Technical Dictionary," published in 1939 by The Chemical Publishing Co. Inc., that 2-amino-pyridine or alpha-pyridyl-amine has a melting point of 56° C. and that it is soluble in water and alcohol; 3-amino-pyridine or beta-pyridyl-amine has a melting point of 64° C. and that it is soluble in water and alcohol; and that 4-amino-pyridine or gamma-pyridylamine has a melting point of 158° C. and that it is also soluble in water and in alcohol.

We have described preferred embodiments of our invention, but it is clear that numerous changes and omissions can be made without departing from the same.

We claim:

1. A compound selected from a class which consists of alpha-pyridyl-ammonium p-aminobenzoate, beta-pyridyl-ammonium-p-aminobenzoate, gamma - pyridyl - ammonium p - aminobenzoate, alpha-alpha'-pyridyl-diammonium p-aminobenzoate, and pyridine-6-methyl-2-ammonium p-aminobenzoate.

2. A new compound, a water-soluble pyridyl-ammonium-p-benzoate, said compound having the formula:

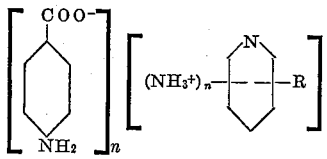

R being selected from the group consisting of hydrogen and alkyl, $n$ being an integer which is not greater than 2.

3. A method of making a pyridyl-ammonium-p-aminobenzoate which is more soluble in water than p-aminobenzoic acid, which consists in intermixing an aminopyridine with p-aminobenzoic acid while said substances are dissolved in a substantially non-aqueous solvent, and then cooling said solvent to precipitate a compound having the following formula:

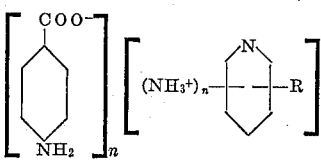

R being selected from the group consisting of hydrogen and alkyl, $n$ being an integer which is not greater than 2.

4. A new compound, a water-soluble pyridyl-ammonium p-amino benzoate, said compound having the formula:

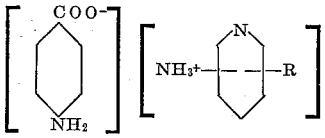

R being selected from the group consisting of hydrogen and alkyl; said compound being more soluble in water than p-aminobenzoic acid.

SAMUEL M. GORDON.
FRANK KIPNIS.